Dec. 27, 1960

J. J. VEGEZZI 2,966,375

SEALING DEVICE FOR THE BEARINGS OF COMPRESSORS OR SIMILAR MACHINES

Filed Sept. 22, 1958

2 Sheets-Sheet 2

INVENTOR
Jean Joseph Vegezzi
BY
Bacon & Thomas
ATTORNEYS

United States Patent Office 2,966,375
Patented Dec. 27, 1960

2,966,375

SEALING DEVICE FOR THE BEARINGS OF COMPRESSORS OR SIMILAR MACHINES

Jean Joseph Vegezzi, Saint Cloud, France, assignor to Commissariat a l'Energie Atomique, Paris, France Filed Sept. 22, 1958, Ser. No. 762,380

5 Claims. (Cl. 286—11.14)

The present invention has as its object the provision of an improved sealing device for bearings of compressors or similar machines which are liable to come into contact with a particularly corrosive atmosphere or one which might cause harmful abrasion.

Such a sealing device comprising a tight joint arranged between the harmful atmosphere and the bearing is characterised essentially in that the said joint is a dry joint formed, in combination, by an element rendered integral and air-tight with the said shaft and having a rotary surface about the shaft's axis, and by a second element rendered integral and air-tight with the said mounting and having a rotary surface flexibly applied against the surface of the other element, one of the elements being constituted by a good heat-conducting metal support coated with a metal or porous, sintered, metal-alloy which is resistant to the effects of the harmful atmosphere and is in itself impregnated with a self-lubricating substance forming a film on its surface, and the other element being produced in a metal or metal-alloy resistant to the effects mentioned above, in a non-porous state and perfectly machined and ground.

Figure 1:
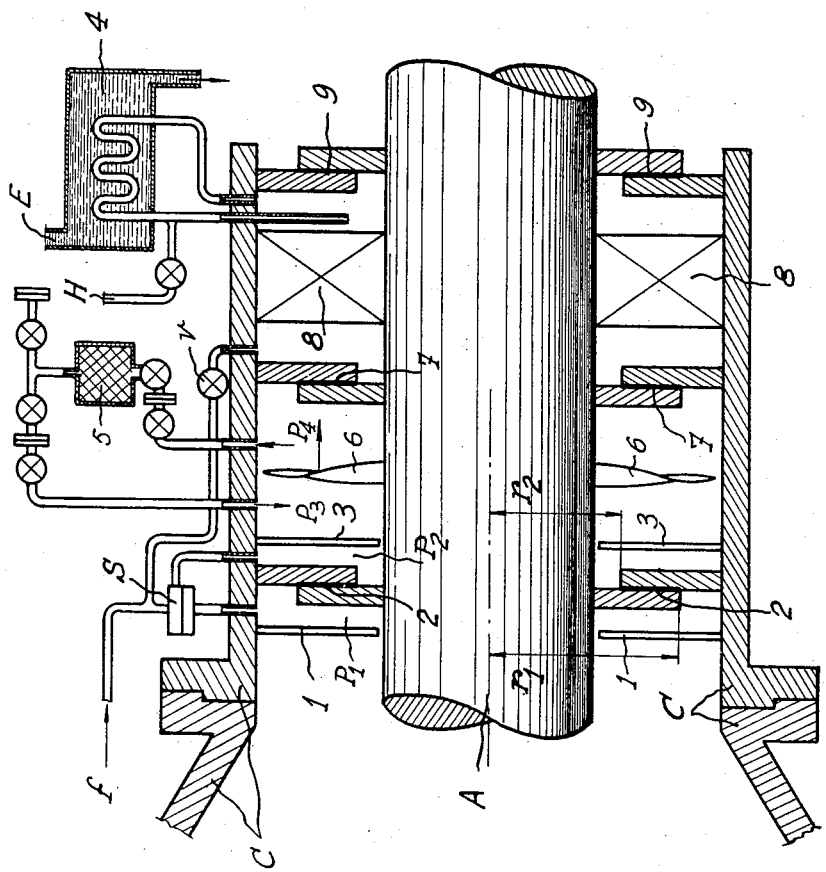
Figure 2:
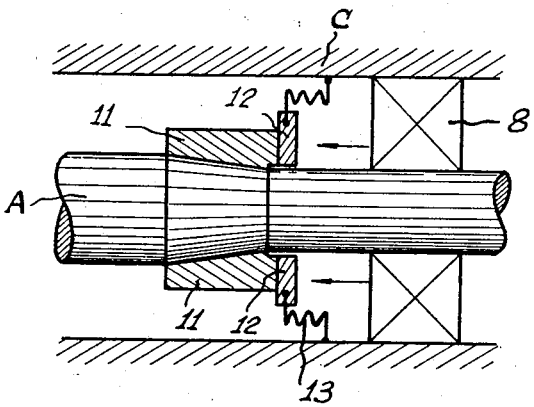
Figure 3:
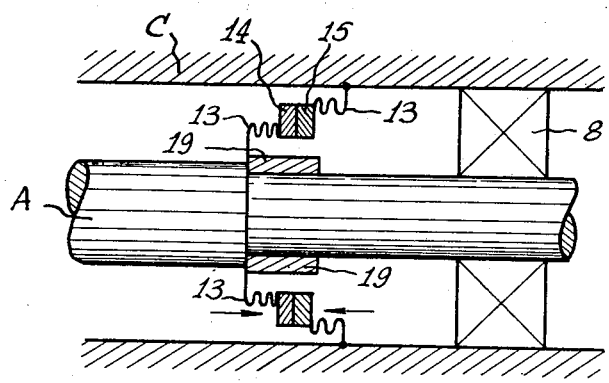
Figure 4:
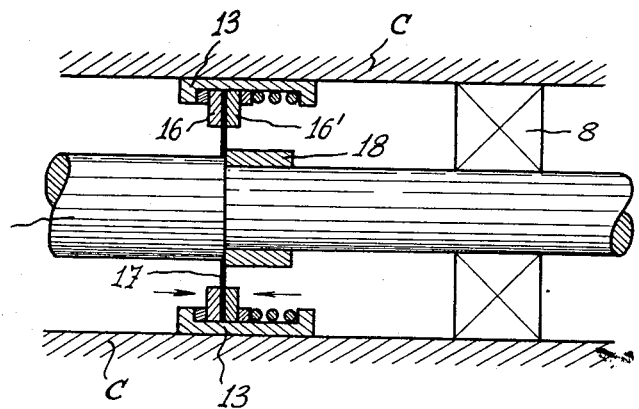

The invention, which, incidentally, also covers other characteristics, will moveover be better understood from the description which now follows and in which reference will be made to the accompanying drawings presented by way of non-limitative example, and in which:

Figure 1 represents, diagrammatically, in longitudinal section, a bearing according to the present invention, Figures 2, 3 and 4 are diagrammatic sections showing modified forms of a contact-sealed joint according to the invention.

Referring to Figure 1 it is seen that there is a compressor shaft A and the compressor's body C. Now, let it be supposed for example, that the harmful atmosphere is located on the left-hand side of Figure 1, the right-hand portion of the shaft being located in the ambient air towards the coupling to the driving motor not represented.

On the left-hand side of the figure are seen two annular partitions 1 and 3 integral with body C and terminating in the near vicinity of the shaft A. The object of these two partitions is to stabilise the pressure P1 and P2 of each side of an air-tight, non-lubricated, dry joint in accordance with the invention and shown diagrammatically at 2.

It is understood that this stabilisation is favourable in order that the best tightness conditions may be set up and that the following relationship shall be satisfied.

$$P_1 r_1 - P_2 r_2 = 0$$

$r_1$ being the outer radius of the joint's left-hand ring, Figure 1, integral with the shaft A, $r_2$ being the inner radius of the joint's right-hand ring, integral with the compressor body C, P1 being the pressure of the harmful atmosphere dependent on the compressor, P2 being the pressure of a neutral gas, controlled at P1 and such that $$\frac{P_1}{P_2} = \frac{r_2}{r_1}$$

precisely.

The pressure-control system is shown diagrammatically at S, Figure 1, the arrow $f$ indicating the intake of the neutral gas.

The joint 2, which is the subject of the invention, and which is anti-corrosive and self-lubricating, may be produced in various ways and Figure 2 represents, diagrammatically one arrangement.

A ring 12 is secured to the body C of the compressor through the intermediary of any appropriate, flexible, airtight, fitment—shown diagrammatically at 13—in such a manner as to be pulled over to the left against a second ring 11 secured to the shaft A.

The ring 12 has a metal support faced with a sintered, porous metal itself impregnated by a self-lubricating substance forming a film on its surface. The metal support thus confers on the ring its qualities of thermal conductivity and its mechanical resistance, whilst the film of impregnated matter confers on it its qualities of self-lubrication, antifriction and resistance to wear.

The metal support is produced in any appropriate metal which is a good conductor of heat. The porous facing metal which has to resist the effects set up by the harmful atmospheres such as for example, hexafluoride of uranium $UF_6$, may be made, for example from Monel metal (basic composition Ni 67%; Cu 30%; Fe 1.4%; Si 0.11%; M 1%; C 0.15%), nickel, beryllium bronze, one of the alloys known under the name of "Stellites" (alloys with a composition of C 2 to 3%; Co 40 to 55%; Cr 25 to 35%; W 10 to 20%), NSM 22 steel, sintered aluminium or other suitable material. An impregnation film may be polytetrafluoroethylene, for example, known under its trade name of "Teflon," with a thickness of from 0.01 to 0.04 mm.

The co-operating ring 11 is made of one of the above metals, but in a non-porous condition and perfectly machined and ground so as to be smooth.

Obviously, should the necessity arise, it is possible to make provision for several pairs of rings such as 11 and 12, to constitute the joint 2.

According to the variant execution shown in Figure 3, one of the two rings 14 and 15 is self-lubricating in accordance with the invention and they are both mounted flexible, respectively, on the shaft A and the body C.

The ring 14 is flexibly supported by an air-tight system 13 which moves it towards the right and which is secured to the shaft A by its support gripping against a shoulder on the shaft by way of a washer 19.

The ring 15 is secured to the body C of the compressor through the intermediary of a flexible, air-tight system 13 which moves it towards the left against the ring 14.

Figure 4 shows another variant execution of the joint 2 making it possible to have pressures which are fairly equal on either side of the joint.

Two rings 16 and 16', self-lubricating in accordance with the invention, are flexibly gripped on their outer edges by a flexible, air-tight fitment 13 engaging the body of the compressor. They grip between them an annular plate 17 secured to the shaft A by its inner edge which is gripped against a shoulder of the shaft A by a washer 18. This plate 17 is made of one of the metals stated above, but is non-porous, and is perfectly machined and ground. It rotates between the rings 16 and 16'.

It will be appreciated that the flexible mountings 13 in Figures 2 to 4 have been represented in diagrammatic form in these figures and they may consist of any appropriate air-tight fitment, their purpose being to apply flexibly, one against the other, the elements which work together to form the joint.

In the example as represented in Figure 1, apart from the joint 2 in accordance with the invention, provision has been made for a second contact-joint 7 in anti-corrosive substance, lubricated by a standard oil or appropriate lubricant. Between the partition 3 and the joint 7, a ventilator is fitted—shown diagrammatically as one vane 6—in such a manner as to bring about a circulation between the regions P3 and P4, in the direction of the arrows, and also in a filtering circuit 5 the outlet of which empties in the region P3 and whose inlet is located in region P4. This circuit 5 has as its object the task of separating from the neutral gas located in region P2 the oil fumes emanating from the joint 7 with a view to evacuating these fumes. In this way, neither the joint 2 of the invention, nor the atmosphere located on its left-hand side in Figure 1, is polluted by oil fumes.

It is possible, should it be deemed desirable, to put a second filtering circuit (not represented) in parallel with the circuit 5, this making it possible to insulate the circuit which is in service if this circuit happens to become saturated prior to a period of time when the compressor is not working, for reasons of maintenance, for example.

The enclosed space between the joints 2 and 7 is under neutral gas with traces of oil and traces of noxious atmosphere if the joint 2 is not absolutely gas-tight to this atmosphere. These traces depend quantitatively on the efficacy of the joints 2 and 7 and on the filter 5.

To the right of the joint 7 is located a bearing 8 of standard type, supporting the shaft A in the body of the compressor; it is a plain or a cylindrical or conical roller bearing depending on the function it has to fulfill. This bearing is lubricated—bearing in mind the compressor's rotary speed—by circulating oil or the projection of oil mist, the inlet of which is shown diagrammatically by the piping H.

Finally, a last standard-type joint 9, surface fitting and lubricated, is located to the right of the bearing 8 and is in contact, on the right, with the ambient air at atmospheric pressure. It serves to insulate the enclosed space between the joints 7 and 9 from the atmosphere.

The lubrication system of the joints 7 and 9 should be plentiful, the oil evacuating the greater part of the heat generated by the joints. The job of cooling this oil is taken care of by an exchanger depicted diagrammatically at 4, which may, if needs be, be further cooled by a water circulation E.

The space enclosed between the joints 7 and 9 is thus located in an atmosphere containing neutral gas, oil fumes and the smallest percentage of air possible. It is possible, if so desired, to introduce neutral gas into this space as from the inlet $f$ by a valve $v$.

Naturally, the practical implementation of the joint 2 of the invention may be considered using other detail variants which would still fall within the scope of the present invention.

What I claim is:

1. A sealing device for a rotatable shaft element extending into a casing element having a corrosive atmosphere under pressure therein, comprising: a dry seal positioned between said shaft and casing; said dry seal comprising a first member mounted on said shaft and having an annular sliding surface around said shaft and a second member fixedly mounted on said casing and having a sliding surface resiliently pressed against said sliding surface of said first member; a second seal having smooth oil-lubricated surfaces positioned axially outwardly of said dry seal; means for circulating an inert fluid under pressure in the space between said seals; and means for controlling said pressure in said space.

2. A sealing device as defined in claim 1 including an annular partition on each side of said dry seal, said partitions being mounted on one of said members and extending into close proximity to the other member to define restricted passageways therebetween.

3. A sealing device as defined in claim 1 wherein said means for circulating inert fluid includes means on said shaft for causing fluid flow in said space in a direction from said dry seal toward said oil-lubricated seal.

4. A sealing device as defined in claim 3 wherein said means for circulating inert fluid further includes means for introducing and withdrawing inert fluid from said space and means for filtering said fluid.

5. A sealing device as defined in claim 1 wherein said first member is composed of a metallic support having good heat-conducting properties, which is covered with a film of metal, porous, sintered and resistant to the corrosive atmosphere, namely hexafluoride of uranium $UF_6$, and selected from the group consisting of Monel metal, nickel beryllium bronze, alloys known as Stellites, NSM 22 steel and sintered aluminium, said film itself having a thin film of polytetrafluorethylene thereon, the second member of the dry seal being made of one of the metals selected from the above group, but in nonporous condition, accurately machined and ground.

References Cited in the file of this patent

UNITED STATES PATENTS

| | | |
|---|---|---|
| 2,279,167 | Jackson | Apr. 7, 1942 |
| 2,857,182 | Bain et al. | Oct. 21, 1958 |